United States Patent Office 2,969,615
Patented Jan. 31, 1961

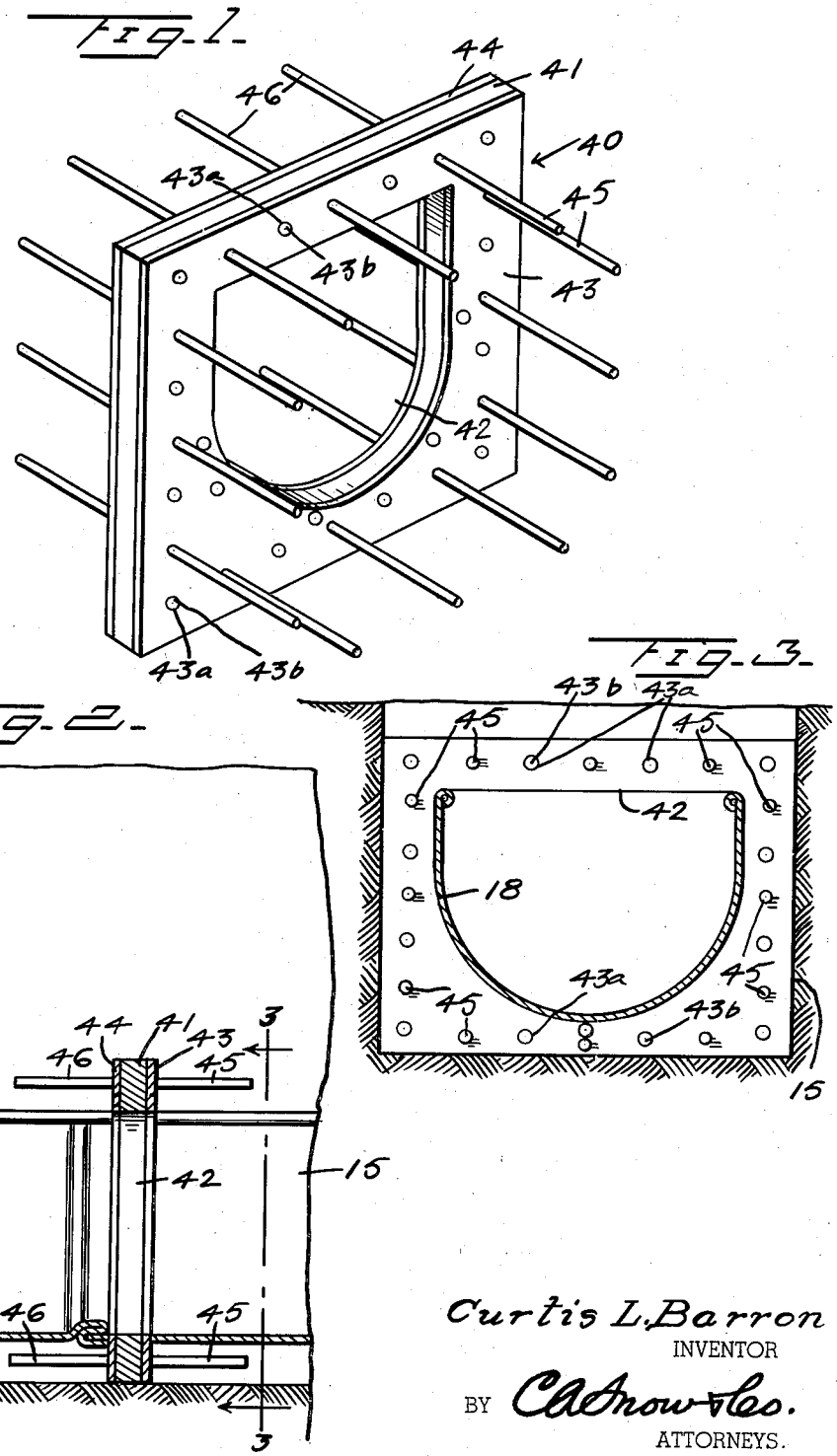

2,969,615

EXPANSION GASKET FOR LIQUID CONVEYORS

Curtis L. Barron, Sacramento, Calif.
(Rte. 2, Miles, Tex.)

Original application July 3, 1956, Ser. No. 595,667, now Patent No. 2,843,913, dated July 22, 1958. Divided and this application May 15, 1957, Ser. No. 659,309

1 Claim. (Cl. 50—155)

This invention relates to a liquid conveyor, and has particular applicability to a compressible gasket adapted to be inserted in a concrete irrigation channel or duct prior to the formation and setting of the duct, to provide a compressible expansion joint between sections, and comprises a division of my copending application Serial No. 595,667, filed July 3, 1956, now Patent No. 2,843,913 entitled Strato Flow Liquid Conveyor.

A primary object of this invention is the provision of an improved compressible joint adapted to be positioned between duct sections of a concrete duct, the elements of the joint having anchor rods adapted to be embedded in the abutting ends of the duct section prior to setting of the concrete, and held in position therein by the hardened concrete.

A further object of the invention is the provision of a joint structure of this nature provided with a plurality of holes or openings in opposed face plates, through which rubber comprising portions of a gasket positioned between the face plates may be extruded in the form of fingers during the formation of the gasket.

An additional object of the invention resides in the method of forming such a compressible gasket structure wherein preformed face plates of metal or similar material are positioned in the mold, and rubber material poured therebetween in liquid form, the rubber being allowed to harden, and the assembled plates and rubber gasket then positioned in a ditch, and concrete poured on opposite sides thereof to form an integral concrete duct having expansion joints between sections.

Still other objects will in part be pointed out hereinafter as the description of the invention proceeds, and shown in the accompanying drawing, wherein there is disclosed a preferred embodiment of this inventive concept.

In the drawing:

Figure 1 is a perspective view of a formed gasket adapted to be positioned between adjacent duct sections.

Figure 2 is a longitudinal vertical sectional view showing the gasket in position in a duct to be formed, a portion of a duct liner also being disclosed, and Figure 3 is a sectional view taken substantially along the line 3—3 of Figure 2 as viewed in the direction indicated by the arrows.

Similar reference characters refer to similar parts throughout the several views of the drawing.

Having reference now to the drawing in detail there is generally indicated at 40 a flexible gasket assembly adapted to be positioned at spaced intervals within a ditch 15 or the like, to form a compressible expansion joint between sections of a concrete duct adapted subsequently to be poured into the ditch, which forms an outer mold form therefor, and sheets of U-shaped metal 18 comprising an inner form for the duct.

Each gasket assembly comprises a resilient rubber gasket member 41 having a central U-shaped opening 42 of a configuration and size to accommodate a form member 18.

The gasket assembly 40 also includes face plates or weight members 43 and 44 on opposite sides thereof, each provided with horizontally projecting right angularly disposed anchoring rods 45 and 46 respectively extending at right angles from the opposite faces thereof which are adapted to project into the concrete of the duct as it is formed so as to be embedded therein. All of these rods are disposed in spaced relation exteriorly of the central U-shaped opening 42.

Each of plates or weights 43 and 44 are formed with a large number of spaced holes 43a and 44a respectively which extend through the respective plates, and into which protrude fingers 43b and 44b respectively which comprise portions of rubber gasket 41.

In the manufacture of the assembly 40, the weights 43 and 44 are positioned in a mold and the rubber material forming the gasket 41 is poured therebetween in liquid form to ooze into holes 43a and 44a. Thus the fingers 43b and 44b will provide a bond between gasket 41 and plates or weights 43 and 44, as well as provide rubber material at the ends of fingers 43b in direct contact with the concrete when the gasket assembly is embedded in the concrete forming the duct.

It is to be understood that the gasket assembly forms a permanent part of the concrete duct, and provides a compressible expansion joint which is substantially leak proof, and firmly secured to the opposite ends of confronting ducts.

From the foregoing it will now be seen that there is herein provided an improved gasket construction which accomplishes all of the objects of this invention, and others, including many advantages of great practical utility and commercial importance.

As various embodiments may be made of this inventive concept, and as various modifications may be made in the embodiment hereinbefore shown and described, it is to be understood that all matter herein is to be interpreted merely as illustrative and not in a limiting sense.

I claim:

A gasket for interposing between the confronting ends of aligned concrete ducts, comprising a pair of parallel spaced identical plates having central substantially U-shaped openings, said plates having a plurality of aligned openings, a thick rubber gasket disposed between the plates, portions of said rubber gasket filling said aligning openings, uniting said plates, and a plurality of anchor rods having one of their respective ends affixed to and projecting at right angles from the outer sides of each of said plates, providing anchors for said gasket anchoring the gasket to a concrete plastic foundation surrounding said gasket.

References Cited in the file of this patent

UNITED STATES PATENTS

| | | |
|---|---|---|
| 749,765 | Wight et al. | Jan. 19, 1904 |
| 1,819,694 | Sperry | Aug. 18, 1931 |
| 1,942,489 | Pfefferle | Jan. 9, 1934 |
| 2,116,746 | Wells | May 10, 1938 |
| 2,249,510 | Welker | July 15, 1941 |
| 2,365,550 | Heitzel | Dec. 19, 1944 |
| 2,422,266 | Steinke | June 17, 1947 |
| 2,518,640 | Purinton | Aug. 15, 1950 |
| 2,798,746 | Hoyer | July 9, 1957 |